United States Patent
Shimizu et al.

(10) Patent No.: US 8,365,614 B2
(45) Date of Patent: Feb. 5, 2013

(54) CORIOLIS MASS FLOW METER HAVING A SUPPORT FRAME INSTALLED BETWEEN THE PAIR OF VIBRATING TUBES

(75) Inventors: Atsushi Shimizu, Osaka (JP); Daishiro Ishikawa, Osaka (JP)

(73) Assignee: Keyence Corporation, Osaka (JP)

( * ) Notice: Subject to any disclaimer, the term of this patent is extended or adjusted under 35 U.S.C. 154(b) by 365 days.

(21) Appl. No.: 12/793,734

(22) Filed: Jun. 4, 2010

(65) Prior Publication Data

US 2011/0000316 A1    Jan. 6, 2011

(30) Foreign Application Priority Data

Jul. 6, 2009    (JP) ................................. 2009-160229

(51) Int. Cl.
*G01F 1/84*    (2006.01)
(52) U.S. Cl. .................................. 73/861.355
(58) Field of Classification Search ........................ None
See application file for complete search history.

(56) References Cited

U.S. PATENT DOCUMENTS

| | | | | |
|---|---|---|---|---|
| 4,252,028 A | * | 2/1981 | Smith et al. | 73/861.355 |
| 4,738,143 A | * | 4/1988 | Cage et al. | 73/861.355 |
| 4,756,198 A | | 7/1988 | Levien | |
| 5,918,285 A | | 6/1999 | Van der Pol | |
| 8,096,192 B2 | * | 1/2012 | Shimizu et al. | 73/861.357 |
| 2009/0173167 A1 | | 7/2009 | Takayanagi | |
| 2010/0000334 A1 | | 1/2010 | Katsurada | |
| 2010/0005906 A1 | | 1/2010 | Shimizu et al. | |
| 2011/0000315 A1 | * | 1/2011 | Tsubota et al. | 73/861.357 |

FOREIGN PATENT DOCUMENTS

| | | |
|---|---|---|
| JP | 64-015921 | 1/1989 |
| JP | 02-006954 | 2/1990 |
| JP | 06-029689 | 8/1994 |
| JP | 2850556 | 11/1998 |
| JP | 11-510608 | 9/1999 |
| JP | 11-337383 | 12/1999 |
| JP | 2003-207380 | 7/2003 |
| WO | 91/08448 A1 | 6/1991 |
| WO | 97/44640 A1 | 11/1997 |

\* cited by examiner

*Primary Examiner* — Harshad R Patel
(74) *Attorney, Agent, or Firm* — Kilyk & Bowersox, P.L.L.C.

(57) ABSTRACT

A Coriolis mass flow meter targeted for measurement of a fluid with a minute flow rate is reduced in weight and size, the flow meter being in which a subframe supporting a vibration exciter and first and second detectors has an outer peripheral wall, a notch and an inner peripheral wall, a circuit board supported by a main frame is positioned in the portion of the notch, the circuit board is housed in a board case penetrating the main frame, and a liquid crystal monitor is mounted in the portion of the circuit board adjacent to supply/discharge portions of a pair of vibration tubes.

7 Claims, 12 Drawing Sheets

CORIOLIS MASS FLOW METER HAVING A SUPPORT FRAME INSTALLED BETWEEN THE PAIR OF VIBRATING TUBES

CROSS-REFERENCE TO RELATED APPLICATIONS

The present application claims foreign priority based on Japanese Patent Application No. 2009-160229, filed Jul. 6, 2009, the contents of which is incorporated herein by reference.

BACKGROUND OF THE INVENTION

1. Field of the Invention

The present invention relates to a Coriolis mass flow meter and, more specifically, relates to a small-sized mass flow meter preferably applicable to measurement of a minute flow rate.

2. Description of the Background Art

Since a Coriolis mass flow meter has an advantage of being capable of directly measuring a mass flow rate with accuracy, historically, its application started to measure a large flow rate, and has recently been expanded to measure a minute flow rate.

A principle of the Coriolis mass flow meter is as follows. When a central portion of a vibration tube through which a fluid is flowing in an axial-line direction is excited, Coriolis forces act in opposite directions in an inlet side portion and an outlet side portion of the vibration tube, and the Coriolis forces in the opposite directions cause generation of twist in the vibration tube. This twist is proportional to the mass flow rate. This twist of the vibration tube is detected as a vibration displacement, a velocity phase difference, or the like between the upstream side and the downstream side in a flowing direction of a fluid with the vibration exciter interposed therebetween, to obtain a mass flow rate from this phase difference or the like.

There have already been proposed vibration tubes having a variety of shapes in Coriolis mass flow meters. The vibration tubes can be broadly divided into a straight tube type which is straight and a curved tube type provided with a curved portion. The curved tube type is typically classified into a type of the inlet and the outlet of the vibration tube being located on the same side and a type of the inlet and the outlet being located on the opposite sides. As for the former type, namely the type of the inlet and the outlet being located on the same side, those having a U-shape in a planar view, a shape of a narrowed space between the inlet and the outlet, a loop shape, and the like are known. Further, the Coriolis mass flow meters are classified, based upon the number of vibration tubes, into a single tube type and a dual tube type provided with two vibration tubes.

A vibration tube using a metal material (typically, stainless steel) has been traditionally adopted to the Coriolis mass flow meter. Japanese Unexamined Utility Model Publication No. S64-15921 (Japanese Utility Model Application No. S62-107307) proposes a vibration tube formed by arranging a tube of a synthetic resin, such as a fluorine resin as a material having excellent corrosion proof properties, on the inner periphery of a metal tube in order to pave the way for application of the Coriolis mass flow meter to medical agents which are acid, alkaline and the like.

Further, Japanese Translation of PCT Publication No. H11-510608 discloses constituting a vibration tube of a plastic material having excellent corrosion proof properties, and cites as examples thereof polytetrafluoroethylene (PAFE), a tetrafluoroalkoxy polymer (PFA), and polyether ether ketone (PEEK).

Japanese Translation of PCT Publication No. H11-510608 above discloses a dual tube type Coriolis mass flow meter. In this Coriolis mass flow meter disclosed in Japanese Translation of PCT Publication No. H11-510608, it is disclosed that a combination of a coil for electromagnetic drive and a permanent magnet is adopted as a detector for detecting a vibrating state of each vibration tube, the coil being arranged on one vibration tube, the permanent magnet being arranged on the other vibration tube.

Further, Japanese Translation of PCT Publication No. H11-510608 proposes separately arranging wires, connected to coils of the vibration exciter and the detectors to the two vibration tubes and extending the wires outside. It goes without saying that the proposal of Japanese Translation of PCT Publication No. H11-510608 is made on the assumption that a controller (circuit board) for the detectors and the vibration exciter is arranged outside.

Japanese Unexamined Patent Publication No. 2003-207380 discloses a dual tube type Coriolis mass flow meter, to which two curved tube type vibration tubes that vibrate as a tuning fork are adopted, for the purpose of application to a fluid with a minute flow rate. It is pointed out as reasons for adopting the two curved tube type vibration tubes that a single tube type has a low drive efficiency and is unbalanced when vibrated, thereby causing the problem of occurrence of vibration leakage, and that the single tube type requires a frame structure with enhanced rigidity to support the detector, namely rigidity against vibrations. Further, Japanese Unexamined Patent Publication No. 2003-207380 proposes soldering a magnetic material such as silicon steel to the vibration tube, fixing a permanent magnet that magnetizes this magnetic material to a frame, and arranging a coil on this frame. Moreover, Japanese Unexamined Patent Publication No. 2003-207380 discloses coupling the extremities of the pair of vibration tubes with each other through insulating plates (brace bars), to form vibration nodes of the vibration tubes.

Incidentally, the vibration leakage is described below. Since a pair of vibration tubes ideally vibrates in a mirror-symmetrical manner, a vibration due to a self-excited vibration is offset on the frame. However, this is an ideal theory, and the tubes are in effect not completely mirror-symmetrical because of their material properties, shapes, assemblies, or the like being nonhomogeneous, nonuniform, or asymmetrical. Hence, the vibrating states in minute vibrations of the vibration tubes associated with the frame or an external pipe vary depending upon the assembled states thereof. This leads to an offset of a zero point of a measured value. This phenomenon is referred to as the vibration leakage. This vibration leakage occurs independently from a vibration from the outside as a disturbance element.

U.S. Pat. No. 4,756,198 discloses a looped dual tube type Coriolis mass flow meter that accepts a fluid from one side and discharges the fluid from the other side. In this Coriolis mass flow meter of U.S. Pat. No. 4,756,198, a vibration exciter and detectors are each configured by a combination of a permanent magnet and a coil, the permanent magnet being installed on the vibration tube, the coil being installed on the frame. This frame disclosed in U.S. Pat. No. 4,756,198 as a member to install the coil on is arranged between the pair of vibration tubes.

SUMMARY OF THE INVENTION

The magnetic material of Japanese Unexamined Patent Publication No. 2003-207380 can also be referred to as an element to be detected in the detector, as with the permanent magnet. The element to be detected such as the magnetic material or the permanent magnet is arranged on the vibration tube and the coil is arranged on the frame, as disclosed in Japanese Unexamined Patent Publication No. 2003-207380 and U.S. Pat. No. 4,756,198.

The frame that supports the vibration tubes, the detectors, and the vibration exciter may not vibrate due to vibrations of the vibration tubes so long as the frame has a robust structure. However, in a case where part of the frame is arranged between the pair of vibration tubes, and the detectors and the vibration exciter are installed in the portion of the frame which is located between the pair of vibration tubes, as this frame portion is made to have an increasingly thick and a robust structure, there is no other choice but to set a larger space between the pair of vibration tubes.

However, as for the Coriolis mass flow meter applied to a fluid with a minute flow rate, seen in Japanese Unexamined Patent Publication No. 2003-207380, applying the frame having a thick and robust structure makes it impossible to satisfy the request for reduction in size and weight. Further, in the Coriolis mass flow meter applied to a fluid with a minute flow rate, when one space between the vibration tubes becomes excessively large, the one vibration tube and the other vibration tube come under different influences of a vibration incoming from the outside as the disturbance element, which might cause an increase in measurement error accompanied by a disturbance vibration.

Further, in the Coriolis mass flow meter designed for a fluid with a minute flow rate as a measurement target, the insulating plate (brace bar) disclosed in Japanese Unexamined Patent Publication No. 2003-207380 has an important role of forming a vibration node. However, there has been a problem in that, when the space between the pair of vibration tubes becomes excessively large, this role of the insulating plate is attenuated, to reduce the effect of blocking a vibration from the outside.

An object of the present invention is to reduce a size and weight of a Coriolis mass flow meter targeted for measurement of a fluid with a minute flow rate.

A further object of the present invention is to provide a Coriolis mass flow meter which ensures weight reduction as well as rigidity of a frame and has a circuit board built therein without inducing a size increase.

A still further object of the present invention is to provide a Coriolis mass flow meter capable of shortening wires that couple the built-in circuit board with the detectors and/or the vibration exciter.

According to the present invention, the technical problems is accomplished by providing a Coriolis mass flow meter, including:

a main frame, which supports in a cantilever state a pair of curved tube type vibration tubes with inlets and outlets thereof located on the same side;

a subframe, which extends in a space between the pair of vibration tubes and the end of which is coupled to the main frame;

a vibration exciter, which is arranged on the subframe and excites the vibration tube;

first and second detectors, which are arranged on the subframe and located on an upstream side and a downstream side of the vibration tube with the vibration exciter interposed therebetween; and a circuit board, which is supported by the main frame, wherein the subframe is formed with a notch that is provided on an inner peripheral side of the curved tube type vibration tube and is open toward the main frame, the subframe is also formed with an outer peripheral wall extending along an outer peripheral edge of the subframe and an inner peripheral wall extending along the notch, and the circuit board supported by the main frame is arranged in the portion of the notch.

Specifically, according to the present invention, the curved tube type vibration tubes with the inlets and the outlets thereof located on the same side are supported by the main frame, and the vibration exciter and the detectors are arranged on the subframe extending in the space between the pair of vibration tubes from the main frame, whereby the frame structure can be reduced in weight, for example by making the main frame of a plastic material while making the subframe of a lightweight metal, with the main frame and the subframe taken as separate structures.

Further, providing the notch in the subframe and arranging the circuit board in the portion of this notch allows the circuit board to be built in without increasing the Coriolis mass flow meter in size.

Moreover, arranging the circuit board in the portion of the notch can make the wires short, the wires connecting the vibration exciter and the detectors arranged on the subframe with the circuit board, so as to reduce deterioration in detection accuracy due to the wires inside the Coriolis mass flow meter. Furthermore, providing the outer peripheral wall and the inner peripheral wall on the outer peripheral edge of the subframe and the inner peripheral edge thereof which defines the notch can enhance the rigidity of the subframe.

In a preferred embodiment of the present invention, the main frame has an opening, and further has a board case that is engaged into the opening to be located therethrough; and the circuit board is housed into the board case, the circuit board extending through the main frame.

According to this preferred embodiment, making the circuit board built-in in the form of penetrating the main frame can connect a cable connecting with an external instrument and a power source by use of the circuit board in the state of not exercising an influence on vibrations of the vibration tubes.

Further, in a preferred embodiment of the present invention, a monitor driving circuit is provided in a portion of the circuit board which is located in a supply/discharge portion of the vibration tube on the opposite side to a measurement portion thereof in which the vibration exciter and the first and second detectors are arranged, with the main frame interposed therebetween, the monitor driving circuit is connected with a display, and the display is mounted on the circuit board.

The Coriolis mass flow meter provided with the display according to the embodiment can include the display without inducing a size increase.

DETAILED DESCRIPTION OF THE INVENTION

Examples

Figure 1:
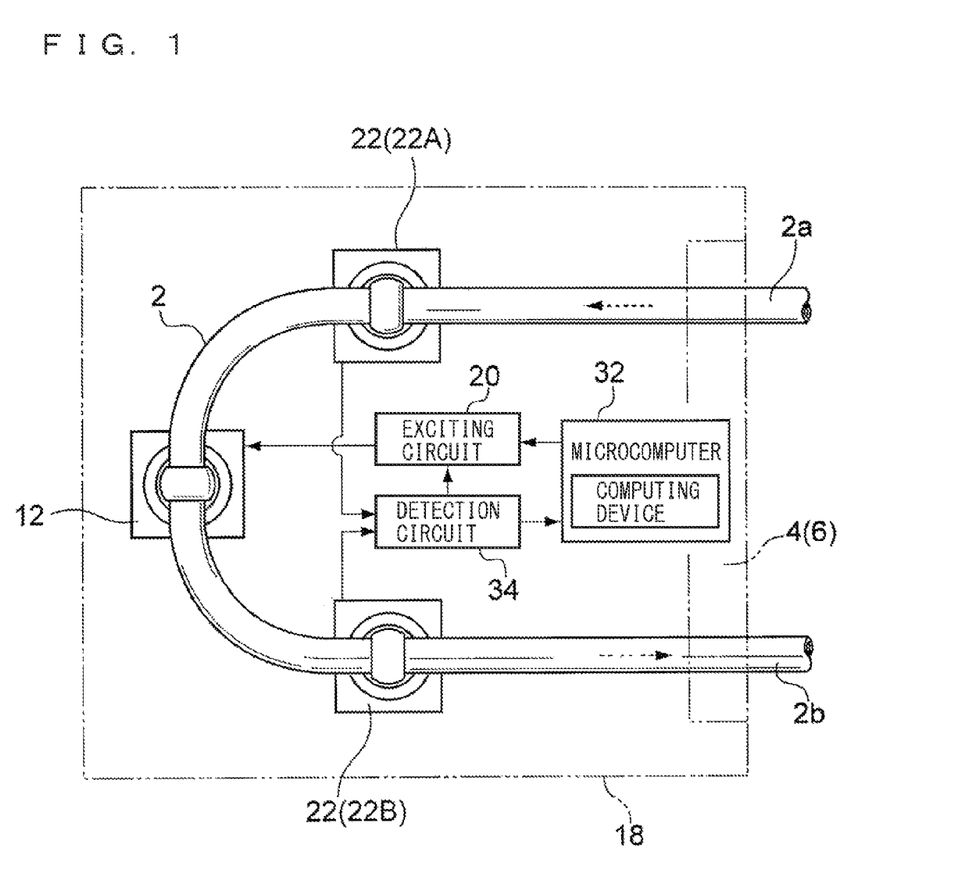
FIG. 1 is a view for explaining constitutional elements associated with an operation of a Coriolis mass flow meter of the present invention.
Figure 2:
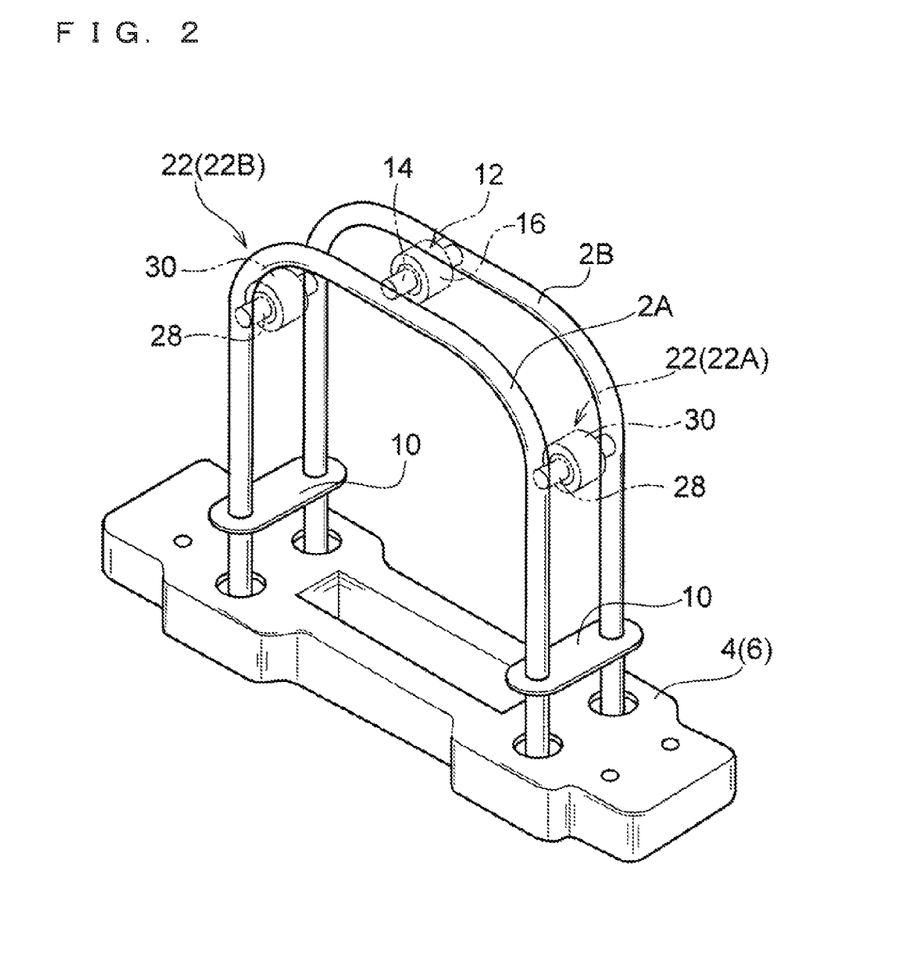
FIG. 2 is a view for explaining a pair of vibration tubes arranged in parallel with each other, a vibration exciter that excites the tubes, and detectors that detect the vibrating states of the vibration tubes.

FIGS. 1 and 2 are views for explaining a structure and a principle of a Coriolis mass flow meter. A vibration tube 2 is configured by a curved tube with its inlet 2a and outlet 2b located on the same side, and a typical example thereof is a U-shaped tube having a U-shape in a planar view. Referential numeral 4 denotes a frame.

The frame 4 has a main frame 6. This main frame 6, namely a support base, is arranged across the extremities of the vibration tube 2, and the U-shaped vibration tube 2 is supported in a cantilever state by this main frame 6. The left side and the right side of the vibration tube 2 in FIG. 1 are respectively a "measurement portion" and a "supply/discharge portion", with the main frame (support base) 6 interposed therebetween. FIG. 2 is a view showing the measurement portion of the vibration tube 2. The vibration tube 2 is configured by a pair of vibration tubes 2A, 2B, arranged in parallel with each other, and a subframe 18 extends in a space sandwiched between the pair of vibration tubes 2A, 2B. The extremities, namely portions adjacent to the main frame 6, of the first and second vibration tubes 2A, 2B are coupled with each other through insulating plates (brace bars) 10, and these insulating plates 10 form nodes of vibrations of the first and second vibration tubes 2A, 2B.

A vibration exciter 12 is arranged at the central portion in an axial-line direction of the U-shaped measurement portion. This vibration exciter 12 is made up of a permanent magnet 14 and a coil 16 for electromagnetic drive (FIG. 2) and are part of detectors 22, and the permanent magnet 14 is arranged on each of the first and second vibration tubes 2A, 2B. Meanwhile, the coil 16 for electromagnetic drive is arranged on the frame 4, more specifically on the subframe 18 (FIG. 1), and allowing an alternating current to flow through the coil 16 for electromagnetic drive via an exciting circuit 20 can vibrate the vibration tube 2. A vibration is most preferably generated so as to vibrate the pair of vibration tubes 2A, 2B with a fixed number of vibrations.

The subframe 18 is described below. The subframe 18 extends in the space between the first and second vibration tubes 2A, 2B, and its end is coupled to the foregoing main frame 6.

As seen from FIGS. 1 and 2, detectors 22 are respectively arranged in the upstream portion and the downstream portion of the measurement portion of the vibration tube 2 with the vibration exciter 12 sandwiched therebetween. In the following description, the detector 22 arranged in the upstream portion is referred to as a first detector 22A and the detector 22 arranged in the downstream portion is referred to as a second detector 22B, as needed.

Each of the detectors 22 is made up of a known electromagnetic pickup, and configured by an element 28 to be detected, made of a permanent magnet, and a coil 30 (FIG. 2). The elements 28 to be detected are arranged on the first and second vibration tubes 2A, 2B, while the coil 30 is arranged on the frame 4, more specifically the subframe 18. The element 28 to be detected reciprocates inside the coil 30 accompanied by vibrations of the vibration tubes 2A, 2B, so that the vibrating states, specifically vibration velocities, of the respective vibration tubes 2A, 2B are detected by the detector 22. Although the permanent magnet is illustrated as the element 28 to be detected, this element 28 to be detected may be made of a magnetic material such as silicon steel as disclosed in Japanese Unexamined Patent Publication No. 2003-207380 above.

As would be understood by one skilled in the art from the above description, the subframe 18 is provided with openings (not shown in the drawing by reason of creating the drawing) penetrating the subframe 18 in portions where the vibration exciter 12 and the first and second detectors 22A, 22B are arranged, and at these openings, the coils 16, 30 are formed.

When a fluid flows through the vibration tube 2, a Coriolis force is generated which is proportional to its mass and velocity and an angular velocity in excitation, and the direction of this Coriolis force agrees with a product of the movement direction (velocity vector) of the fluid and a vector of the angular velocity in excitation of the vibration tube 2. Further, on the inlet side and the outlet side of the fluid in the vibration tube 2, the flowing directions of the fluid are opposite to each other. This causes generation of twist torque in the vibration tube 2 due to the Coriolis force. This torque changes at the same frequency as an excitation frequency, and its amplitude value and a mass flow rate of the fluid have a predetermined relation.

Although distortion of the vibration tube 2 due to a vibration generated by the vibration tube 2 with the vibration exciter 12 and the twist of the vibration tube 2 due to the Coriolis force are superimposed on each other, a computing device 32 including a microcomputer computes a mass of the fluid to be measured which passes through the vibration tubes 2 based upon a phase of an amplitude of the twist, namely the respective vibrating states detected in the respective detectors 22A, 22B and the detection circuit 34, that is, a phase difference in velocity signal among vibrations in the respective positions.

Examples

FIGS. 3 to 12

Figure 3:
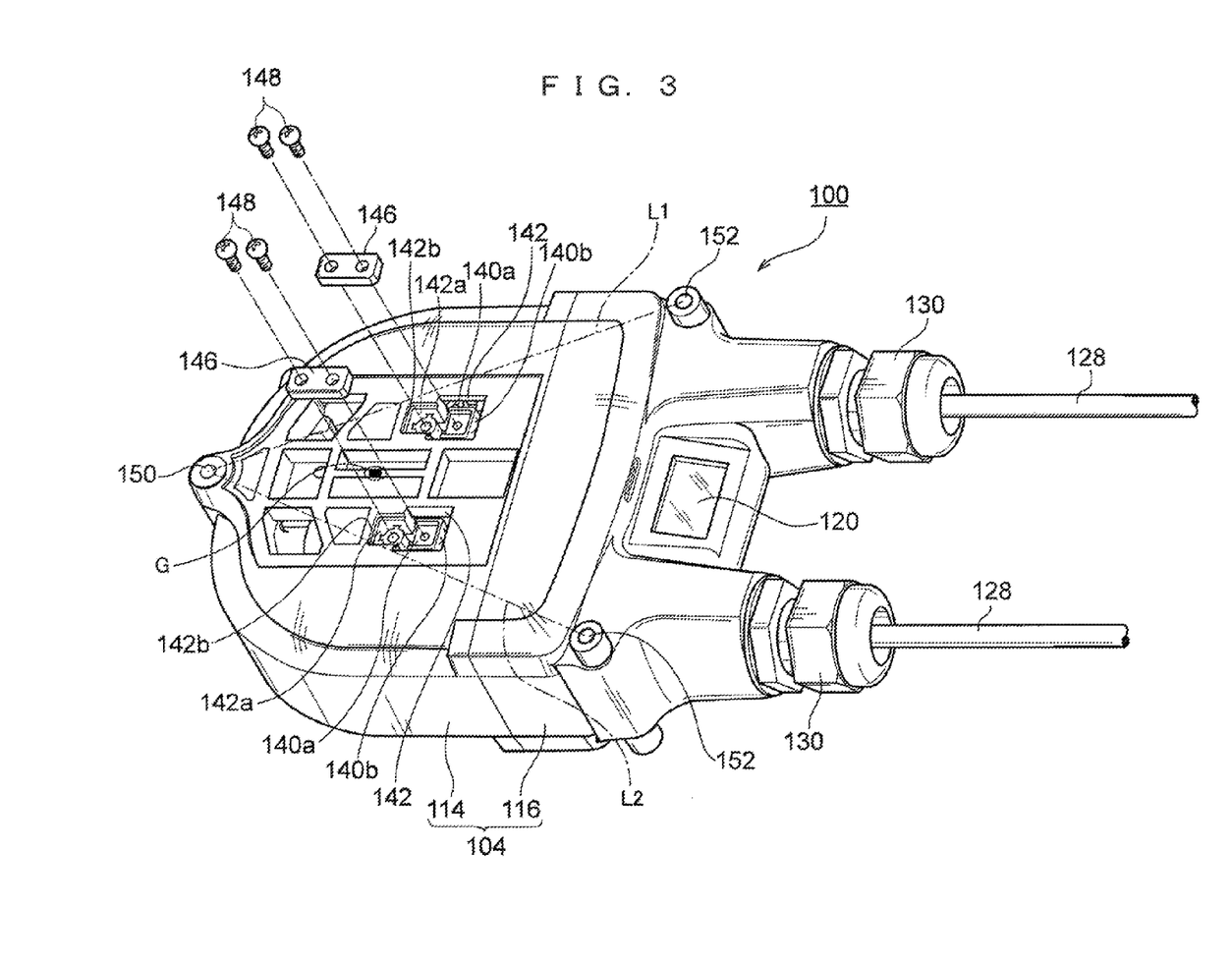
FIG. 3 is a perspective view of a dual tube type Coriolis mass flow meter of an example.
Figure 4:
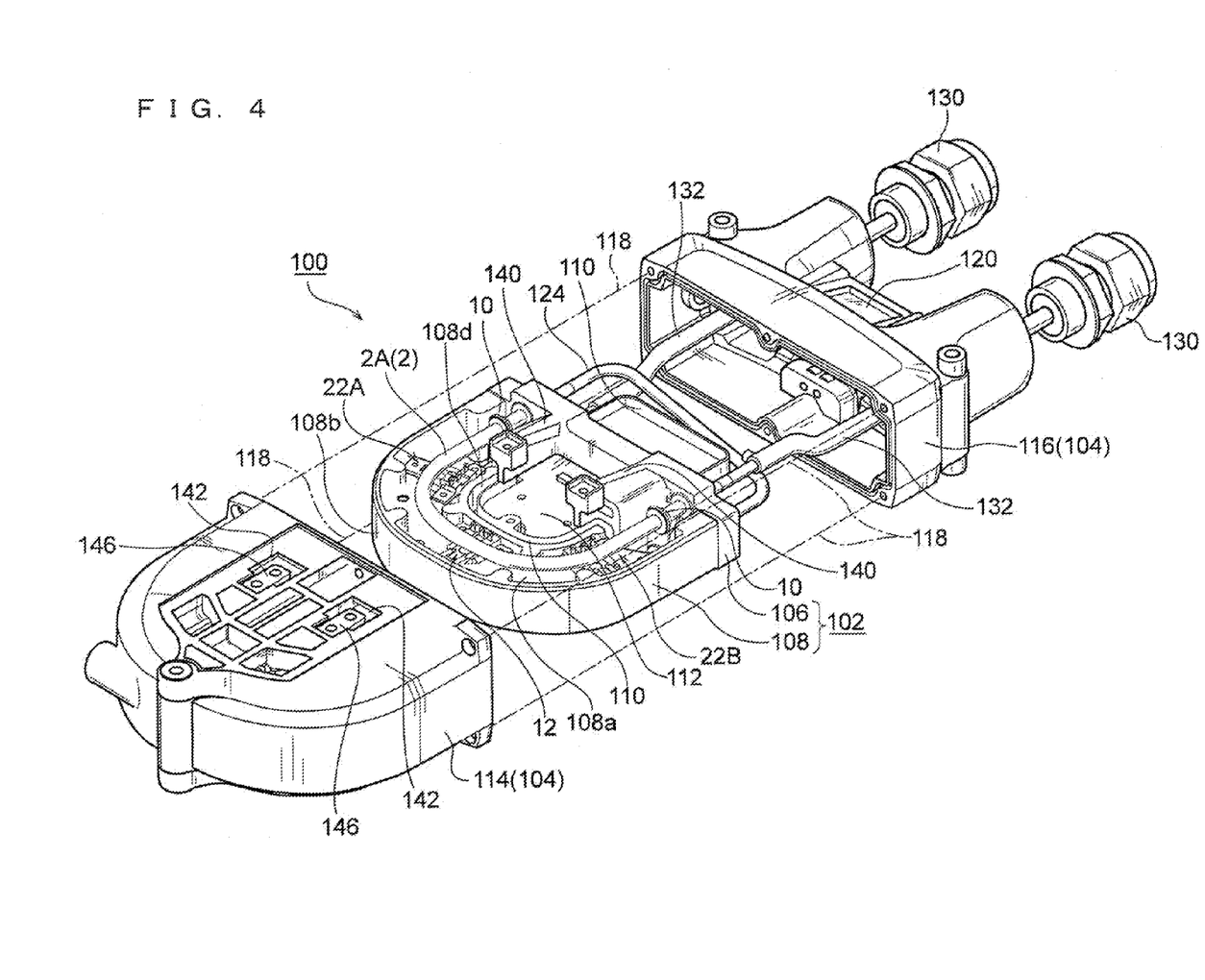
FIG. 4 is an exploded perspective view of the dual tube type Coriolis mass flow meter of FIG. 3.

FIG. 3 is a perspective view of a dual tube type Coriolis mass flow meter 100 of an example, and FIG. 4 is an assembled exploded view thereof. The Coriolis mass flow meter 100 is schematically configured by a frame 102 and an outer case 104 surrounding this frame.

With reference to FIG. 4, although the vibration tube 2 is configured by the two vibration tubes 2A, 2B which are arranged in parallel with each other as described above, the one vibration tube 2B is not shown in FIG. 4 by reason of creating the drawing. In the following description, referential numeral "2" is provided as a generic numeral for the two vibration tubes 2A, 2B. The frame 102 is made up of a support base, namely a main frame 106 which supports the vibration tube 2 in a cantilever state, and a subframe 108 which supports the vibration exciter 12 and the first and second detectors 22A, 22B. The main frame 106 and the subframe 108 are separately structured. The main frame 106 is made up of a plastic molded product, and the subframe 108 is made up of a cast made of light metal, specifically an aluminum alloy. This subframe 108 is fastened with bolts to the main frame 106.

Figure 5:
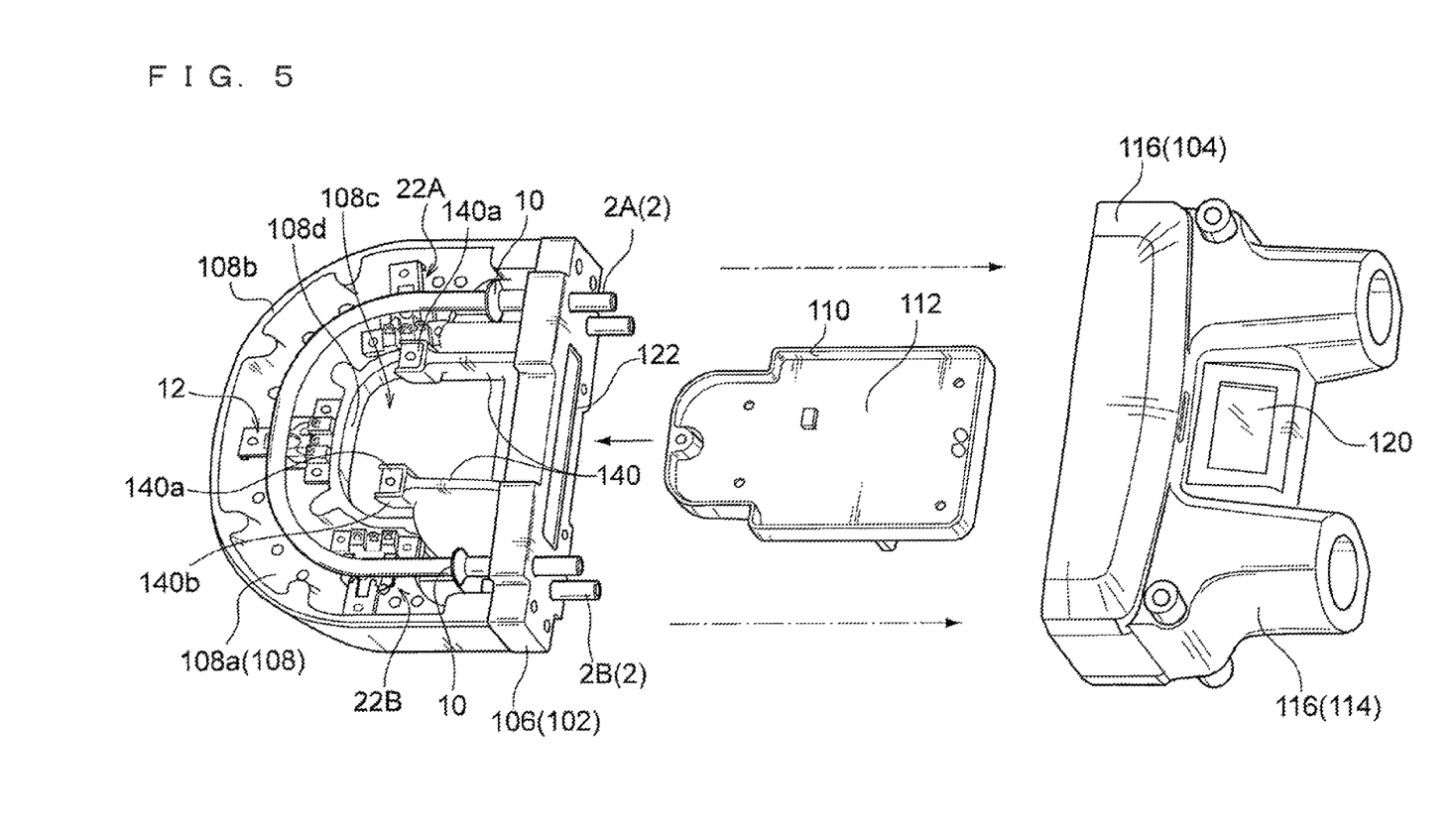
FIG. 5 is a view for explaining a board case to be inserted through an opening of a main frame.

The subframe 108 has a subframe body 108a which is relatively thin and has an outline having an almost similar shape to that of the measurement portion of the vibration tube 2 having a U-shape in a planar view, and an outer peripheral wall 108b which is formed on the outer periphery of this subframe body 108a. The outer peripheral wall 108b has almost the same height size as that of the main frame 106. Inside the measurement portion of the U-shaped vibration tube 2, the subframe 108 has a notch 108c in almost similar shape to that of the measurement portion of the vibration tube 2 (FIG. 5). The notch 108c is open toward the main frame 106, and an inner peripheral wall 108d is formed at the U-shaped inner peripheral edge of the subframe body 108a which defines this notch 108c. The inner peripheral wall 108d continuously extends along the notch 108c, and has a smaller height size than that of the outer peripheral wall 108b.

As thus described, providing the outer peripheral wall 108b and the inner peripheral wall 108d at the outer peripheral edge and the inner peripheral edge of the subframe body 108a can ensure the rigidity of the subframe 108 while reducing the weight thereof. The body 108a of the subframe 108 is located between the pair of vibration tubes 2. Further, since the vibration exciter 12 and the first and second detectors 22A, 22B that are mounted on the subframe 108 are arranged between the outer peripheral wall 108b and the inner peripheral wall 108d, openings (not shown) for accepting the elements of the vibration exciter 12 and the detectors 22A, 22B are formed in places where the vibration exciter 12 and the first and second detectors 22A, 22B are arranged, and these openings penetrate the subframe body 108a.

In the portion of the notch 108c defined by the inner peripheral wall 108d of the subframe 108, a board case 110, which is described later, is arranged (FIG. 5) and a circuit board 112 housed in this board case 110 is positioned adjacently to the measurement portion of the vibration tube 2.

The outer case 104 is configured by a first outer 114 covering the measurement portion of the vibration tube 2, and a second outer 116 covering the supply/discharge portion of the vibration tube 2, and the first and second outers 114, 116 are unified by being fastened with combinations 118 of bolts and nuts.

As best seen from FIG. 3, in the second outer 116 covering the supply/discharge portion of the vibration tube 2, a window 120 for monitoring is formed, through which a display monitor can be looked at from the outside.

The foregoing board case 110 is tightly engaged into an opening 122 (FIG. 5) penetrating the inside and the outside of the main frame 106 that supports the vibration tube 2 in a cantilever state, and then fixed with a screw (not shown). A circuit board 112 to be housed into the board case 110 penetrates the opening 122 of the main frame 106 and continuously extends, and on this circuit board 112, at least one circuit out of the foregoing exciting circuit 20, computing circuit 32, and detection circuit 34 is formed in a portion corresponding to the measurement portion of the vibration tube 2. Most preferably, as in this example, the exciting circuit 20, the computing circuit 32, and the detection circuit 34 are all formed on the circuit board 112. On the other hand, in a portion corresponding to the supply/discharge portion of the vibration tube 2, a liquid crystal monitor (not shown) as the display is mounted, and a monitor driving circuit that drives this liquid crystal monitor is formed on the circuit board 112.

As would be immediately understood by one skilled in the art, providing one circuit board 112 extending through the main frame 106 can shorten the wires electrically coupling the vibration exciter 12 and the first and second detectors 22A, 22B with the circuit board 112, and can also shorten the wire electrically connecting the liquid crystal motor with the circuit board 112.

Figure 6:
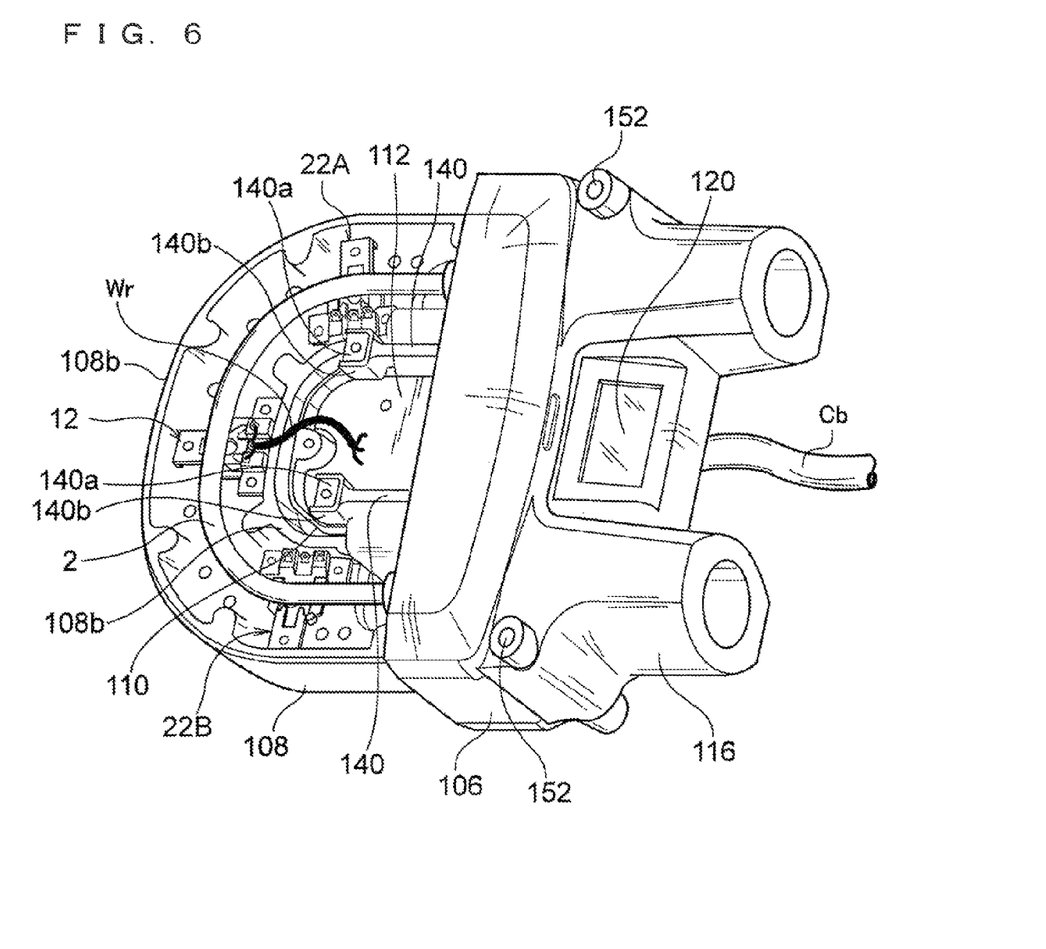
FIG. 6 is a view for explaining that a circuit board and a vibration exciter, built in the dual tube type Coriolis mass flow meter of the example, are connectable with each other through a short wire.

FIG. 6 shows the state of connecting the vibration exciter 12 with the circuit board 112 through a wire Wr, by way of example. Although an illustration of the wires to connect the first and second detectors 22A, 22B with the circuit board 112 is also not given in the drawing, one skilled in the art would be readily aware that the connections are possible by use of short wires. Incidentally, although not shown in the figure, the liquid crystal display monitor that is positioned facing the window 120 for monitoring is mounted on the circuit board 112. Naturally, the end of the supply/discharge portion of the vibration tube 2 is connected with a cable Cb (FIG. 6), and is communicated with an external instrument and a power source through this cable Cb.

Figure 7:
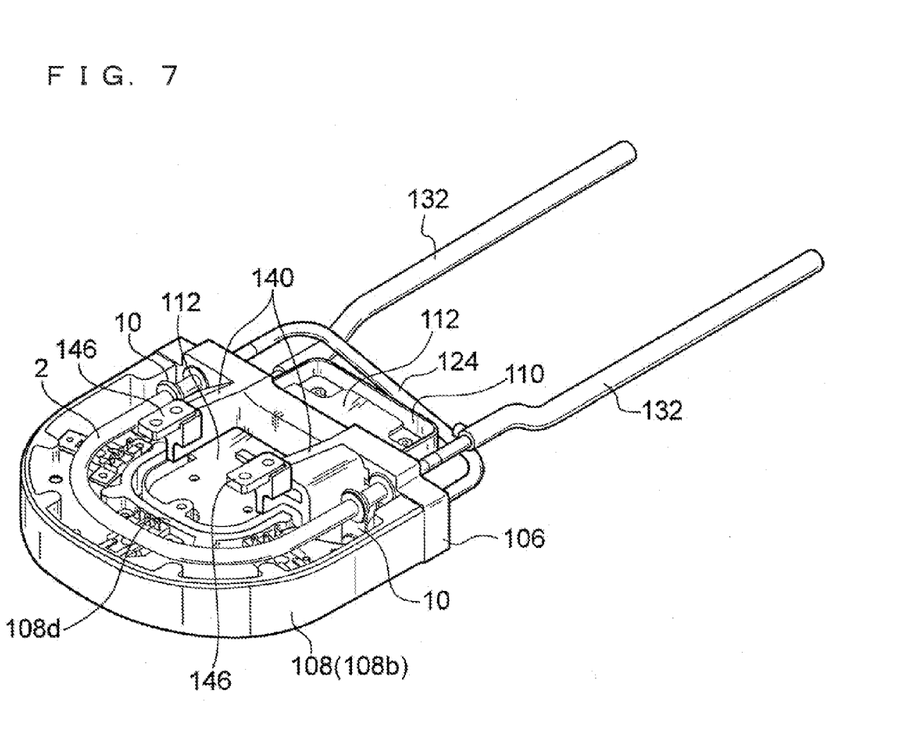
FIG. 7 is a view showing loop type vibration tubes, which are a pair of vibration tubes being coupled with each other through a communication tube, for explaining that these loop type vibration tubes are applicable to the present invention.
Figure 8:
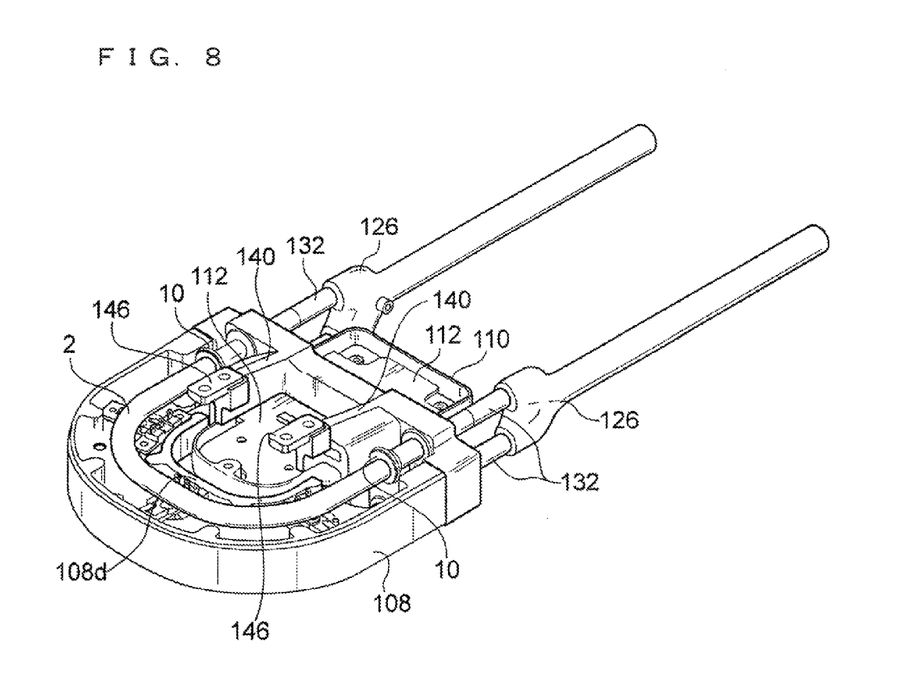
FIG. 8 is a view showing vibration tubes, which are a pair of vibration tubes being coupled independently to manifolds, for explaining that these two independent vibration tubes are applicable to the present invention.

FIG. 7 shows an assembly in which the vibration tube 2 and the board case 110 are incorporated into the frame 102. As seen from FIG. 7, the supply/discharge portions of the pair of vibration tubes 2 are coupled with each other through one communication tube 124, and thereby, the pair of vibration tubes 2 constitutes the loop type vibration tube. FIG. 8 shows a modified example, and as seen from FIG. 8, the two vibration tubes are individually independently coupled to manifolds 126.

Each of the pair of vibration tubes 2 may be a tube made of metal, or may be a tube made of the foregoing corrosion proof plastic. Further, each of the pair of vibration tubes 2 may be a tube being this tube of corrosion proof plastic with its measurement portion reinforced. With reference to FIG. 4, a pair of connecters 130 coupling external pipes 128 to the vibration tube 2 is mountable on the second outer 116, and an elastic tube 132 is inserted and mounted between the connector 130 and the vibration tube 2.

Vibrations from the outside are not only vibrations from the wall surface, but also include vibrations transmitting from the external pipes 128, coupled to the inlet 2a and the outlet 2b of the vibration tube 2, to the vibration tube 2. The vibration of the external pipe 128 can be blocked by the elastic tube 132 (typically, a fluoroplastic resin tube) arranged in the supply/discharge portion of the vibration tube 2. Although the effect of blocking a vibration from the outside through the external pipe 128 by the elastic tube 132 is effective when the vibration tube 2 is made up of a tube of metal such as stainless steel, it is also effective in the case of constituting the vibration tube 2 of a material having excellent corrosion proof properties, such as a fluorine resin base material, and in the case of constituting the vibration tube 2 of this corrosion proof synthetic resin material with its outer periphery reinforced, and also effective on a metal-made tube with its inner peripheral surface made up of a corrosion synthetic resin (typically, fluorine resin) material, and the like. It is to be noted that in the case of the manifold 126 being provided as in the example of FIG. 8, the elastic tube 132 may be arranged between the manifold 126 and the vibration tube 2.

Especially, as for the vibration tube 2 made of a synthetic resin material, reinforcing with a carbon fiber or the like a vibrating portion of the vibration tube 2 from a portion fixed to the frame 102 to the vibration exciter, namely the measurement portion, can lead to the reinforced portion providing sufficient rigidity as the vibration tube 2. In addition to this, not performing the foregoing reinforcement on a connecting portion from the portion fixed to the frame 102 to the external pipe 128 as regarding this portion as a non-reinforced portion can block transmission of a vibration from the external pipe 128 to the reinforced portion, namely the measurement portion of the vibration tube 2 by non-reinforced portion. Naturally, constituting the material for the vibration tube 2 primarily of the synthetic resin material can contribute to reduction in weight of the Coriolis mass flow meter. Further, selecting the fluorine resin base material as the synthetic resin material and forming a fiber reinforced layer on its outer peripheral side facilitates coupling of the frame with the vibration exciter and the detectors, so as to facilitate realization of reduction in size and weight of the Coriolis mass flow meter.

The frame 102 has a left-and-right pair of arms 140 extending from the support base, namely the main frame 106, toward the depth of the subframe 108. The arms 140 extend along the inner peripheral wall 108d of the subframe 108, and are substantially united with this inner peripheral wall 108d. Although the left-and-right pair of arms 140, 140 is shown on the upper side of the subframe 108 in FIG. 4 and the like, a left-and-right pair of arms is also provided on the lower side of the subframe 108, which are not shown on the drawing by reason of creating the drawing. The subframe 108 is formed with a total of four arms 140 extending toward the depth, namely the depth where relatively heavy loads such as the vibration exciter 12 and the first and second detectors 22A, 22B are arranged.

A first rectangular seat 140a having a horizontal surface is formed at the tip of each of the arms 140, namely the end thereof which is the opposite side to the main frame 106, and the three sides of this rectangular seat 140a are defined by a longitudinal wall 140b. More specifically, the longitudinal wall 140b is formed on the three sides of the arm 140, excluding the end portion of the arm 140 toward the front. In other words, the first rectangular seat 140a is open toward the front of the arms 140, namely the depth of the subframe 108.

On the upper and lower surfaces of the subframe 108, namely the first outer 114 surrounding the measurement portion of the vibration tube 2, windows 142 are formed in portions corresponding to the first rectangular seats 140a of the respective arms 140 of the frame 102, and through these windows 142, the first rectangular seats 140a of the arms 140 can be accessed.

The first outer 114 is formed with the second rectangular seat 142a stretching to the window 142. This second rectangular seat 142a is made up of a horizontal surface, and both sides of the second rectangular seat 142a and its side opposite to the first rectangular seat 140a are defined by a longitudinal wall 142b. In other words, the second rectangular seat 142a of the first outer 114 is open toward the first rectangular seat 140a.

The second rectangular seat 142a of the first outer 114 is positioned on a lower level than the top and the bottom surfaces of the first outer 114, and this second rectangular seat 142a is on the same height level as the first rectangular seat 140a of the arm 140. Further, a clearance C is provided between the second rectangular seat 142a and the first rectangular seat 140a. In a housing space having a rectangular shape in a planar view, which is defined by the respective longitudinal walls 140b, 142b of the first and second rectangular seats 140a, 142a, a vibration isolating member is arranged in the first and second rectangular seats 140a, 142a which is made of a flat rubber piece having a rectangular shape in a planar view, complementary to the housing space. This vibration isolating member 146 is fixed with bolts 148 (FIGS. 3, 10) in the state of its end being seated on the first and second rectangular seats 140a, 142a.

While the frame 102 is surrounded by the first and second outers 114, 116, the clearance C is provided between the frame 102 and the first and second outers 114, 116, and the first and second outers 114, 116 are thus coupled with the frame 102 only through the rubber pieces, namely vibration isolating members 146.

The Coriolis mass flow meter 100 is fixed to a wall surface (not shown) with bolts insertable into one first bolt through hole 150 on the top of the first outer 114 and two, a left- and right pair of, second bolt through holes 152 on the bases of the second outer 116, and with nuts to be screwed onto the bolts.

As thus described, the Coriolis mass flow meter 100 of the example is provided with the clearance C between the outer case 104 that is fixed to the wall surface and the frame 102 that is housed into this outer case 104, and the outer case 104 and the frame 102 are coupled with each other through the vibration isolating members (flat rubber pieces having a rectangular shape in a planar view) 146. Hence, the frame 102 is supported by the outer case 104 in a floating manner, whereby a vibration having transmitted from the wall surface to the outer case 104 can be blocked by the vibration isolating member 146 from transmitting to the frame 102, and reversely thereto, transmission of a vibration from the Coriolis mass flow meter 100 to the wall surface can also be blocked by the vibration isolating member 146.

Further, since the vibration isolating member 146 exposes to the outside through the window 142 of the outer case 104 and a replacement operation for the vibration isolating member 146 can thus be performed by access from the outside, not only that damage on the vibration isolating member 146 can be checked with eyes from the outside, but also the replacement operation for the vibration isolating member 146 can also be easily performed. That is, it is not necessary to take the frame 102 out of the outer case 104 for checking damage on the vibration isolating member 146, and further, it is possible to replace a damaged vibration isolating member 146 with a new vibration isolating member 146 without disassembling the outer case 104 and the frame 102.

Figure 9:
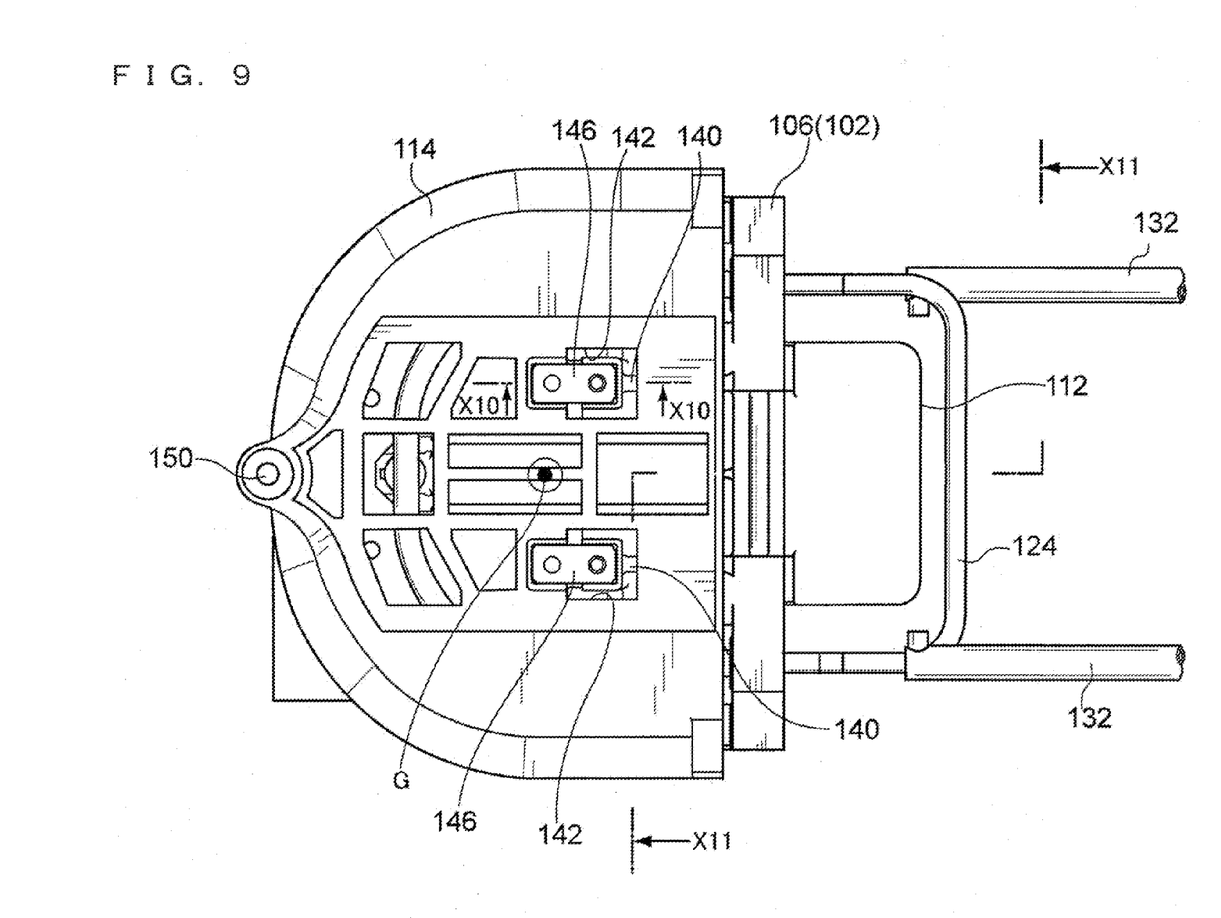
FIG. 9 is a plan view of a frame and an outer tube (first outer) surrounding the frame.
Figure 10:
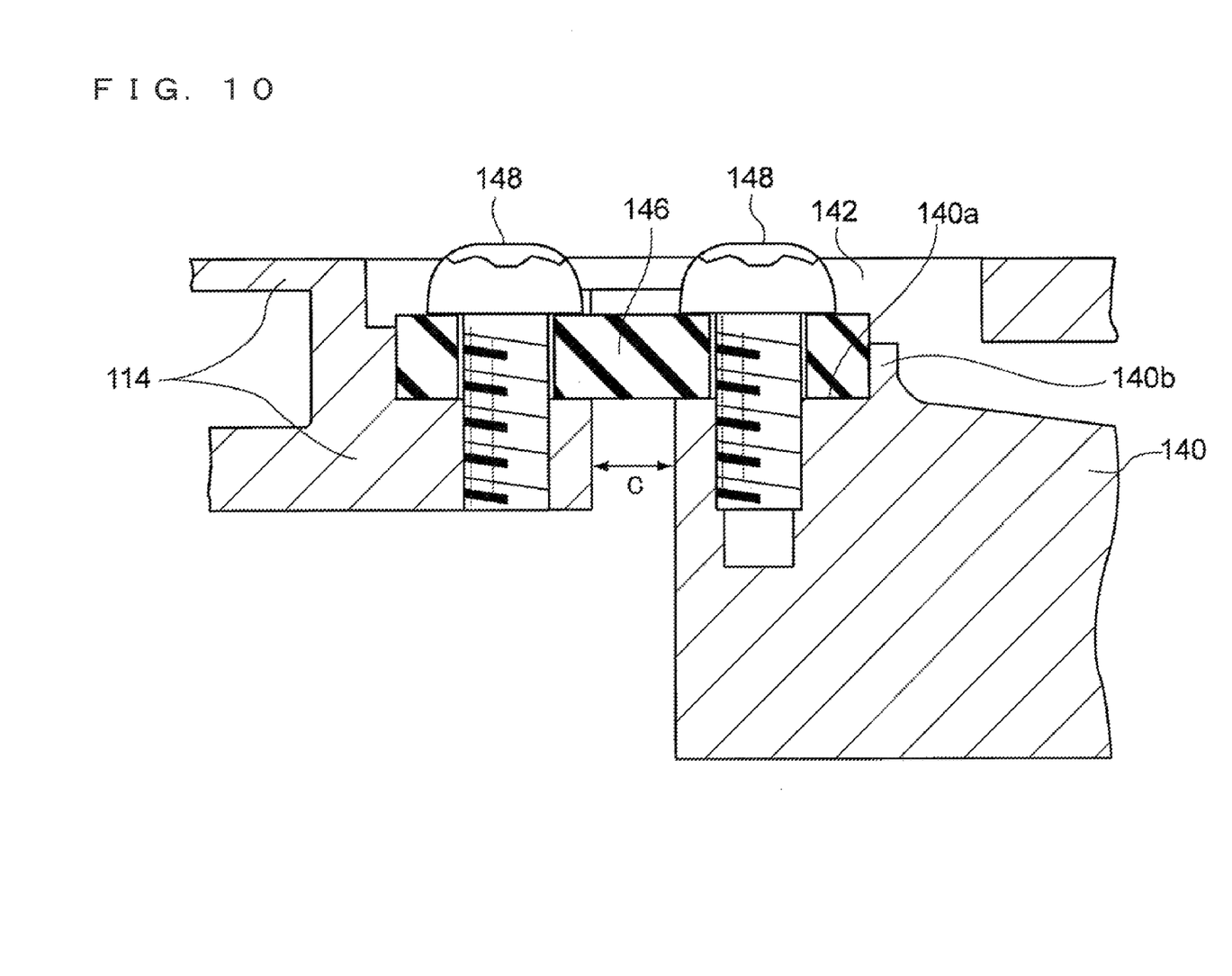
FIG. 10 is a cross-sectional view taken along line X10-X10 of FIG. 9.
Figure 11:
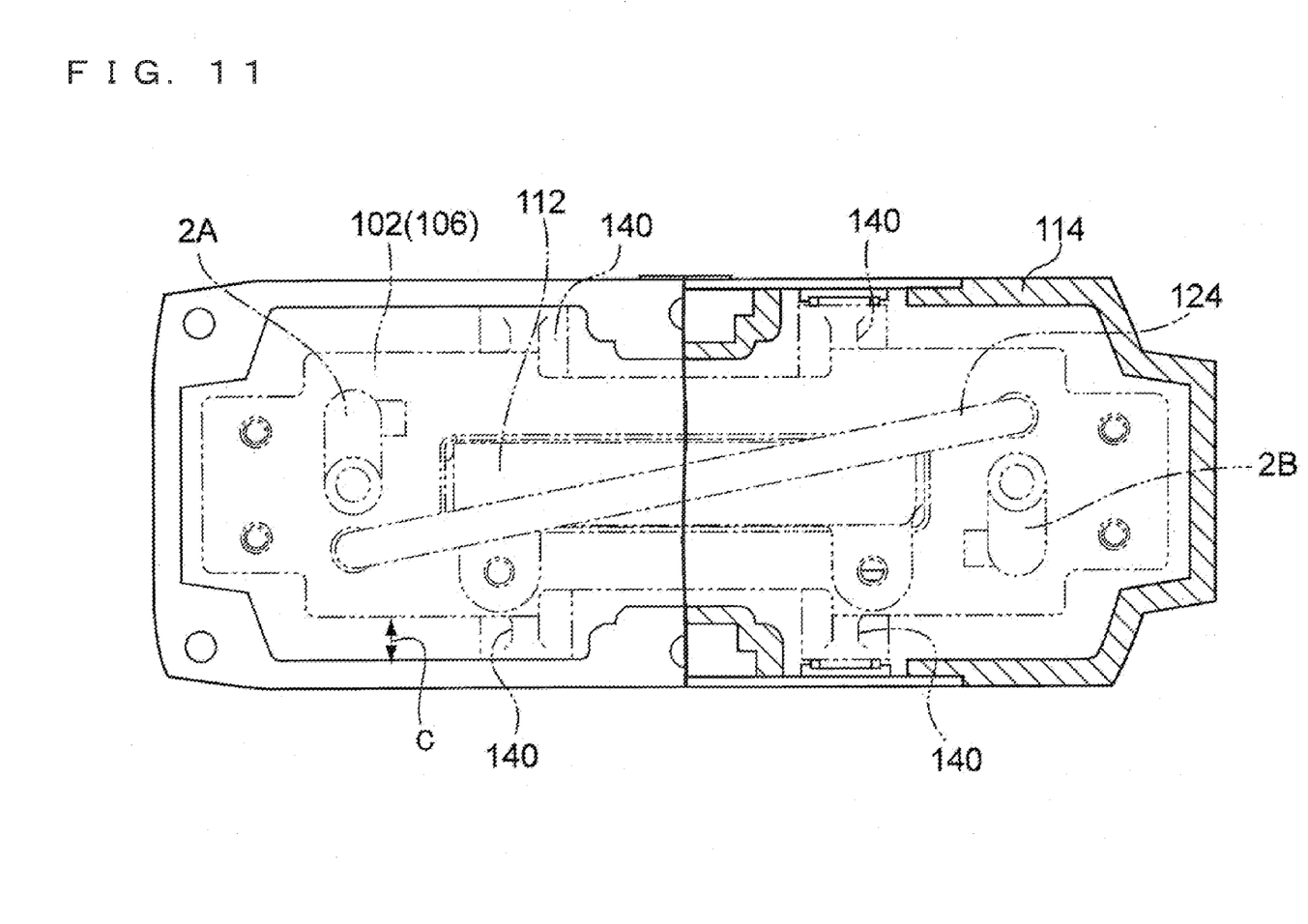
FIG. 11 is a cross-sectional view taken along line X11-X11 of FIG. 9.
Figure 12:
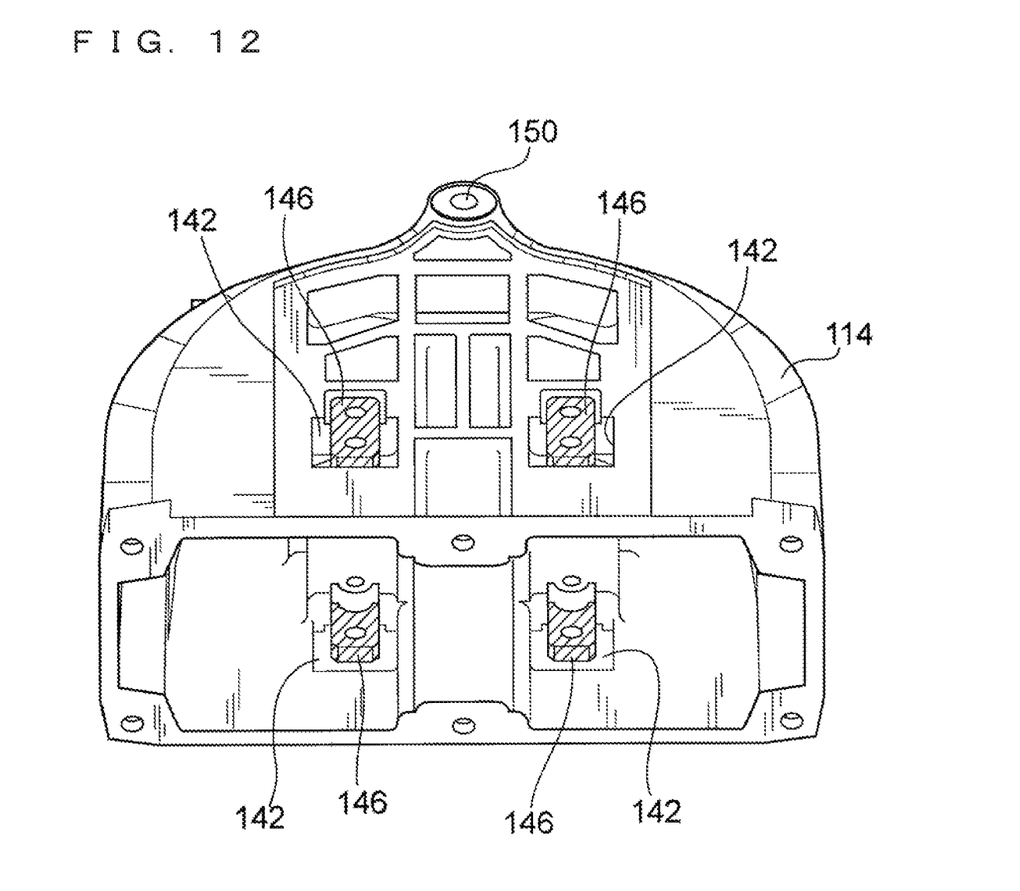
FIG. 12 is a view for explaining that a total of four rubber pieces as vibration isolating members are arranged, as well as a perspective view of the first outer in an outer case seen from the side of its opening.

Moreover, with the area for mounting the vibration isolating member 146 being set at the depth of the subframe 108 by means of the arm 140 extending from the frame 102 (main frame 106), the vibration isolating member 146 can be arranged at a position close to a gravity center G of the Coriolis mass flow meter 100 (FIGS. 3, 9). Furthermore, the vibration isolating members 146 are arranged in the vicinities of straight lines L1, L2 (FIG. 3) connecting the one first bolt through hole 150 and the two second bolt through holes 152, 152 for use in installment of the Coriolis mass flow meter 100 onto the wall surface with three sides thereof supported. Accordingly, as also shown in FIG. 12, the respective pairs of vibration isolating members 146 are arranged on a pair of surfaces of the outer case 104 (first outer 114) so that, by means of a total of four vibration isolating members 146, not only transmission of a vibration between the outer case 104 and the frame 102 can be blocked, but also the vibration isolating effect can be sufficiently exerted even when a vibration isolating member having a simple shape and structure, that is the rubber piece 146, is adopted as the vibration isolating member 146. The vibration isolating effects include adjustment of a zero point due to vibration leakage, in addition to an influence due to an external vibration.

Further, in the dual tube type Coriolis mass flow meter 100 of the example, the subframe 108 located between the pair of U-shaped vibration tubes 2A, 2B has the notch 108c in the portion surrounded by the measurement portions of the U-shaped vibration tubes 2A, 2B (FIG. 5). The circuit board 112 is arranged in the portion of the notch 108c, and this circuit board 112 is supported by the main frame 106 through the board case 110. Naturally, the clearance is provided between the board case 110 and the inner peripheral wall 108d of the subframe body 108a so as not to interfere with each other. Since the exciting circuit 20 and the detection circuit 34 associated with the vibration exciter 12 and the first and second detectors 22A, 22B are formed on this circuit board 112, the wires Wr electrically connecting the vibration exciter 12 and the first and second detectors 22A, 22B with the circuit board 112 can be made short, thereby to allow arrangement of the wires Wr without exercising any influence on the vibration tubes 2A, 2B. Moreover, since the circuit board 112 extends to the supply/discharge portions of the vibration tubes 2A, 2B through the main frame 6, the cable Cb connecting with the external instrument can also be arranged without exercising an influence on the vibration tubes 2A, 2B. Furthermore, even in the case of providing a liquid crystal display monitor in the Coriolis mass flow meter 100, the liquid crystal monitor can be mounted using the board portion of the circuit board 112 which corresponds to the supply/discharge portions of the vibration tubes 2A, 2B.

As thus described, even in the case of the Coriolis mass flow meter 100 where the circuit board 112 provided with the exciting circuit 20 and the detection circuit 34 is built in, forming the notch 108c with an outline along the shape of the vibration tube 2 made up of a curved tube in the subframe 108 can make the circuit board 112 built in the Coriolis mass flow meter 100 without exercising an influence on the size of the Coriolis mass flow meter 100. Further, forming the inner peripheral wall 108d that extends along this notch 108c in the subframe 108 allows a synergistic operation with the outer peripheral wall 108b of the subframe 108, so as to enhance the rigidity of the subframe 108. Therefore, even when the body 108a of the subframe 108 which is located between this pair of vibration tubes 2A, 2B is made thin in order to set the space between the pair of vibration tubes 2A, 2B to an optimal space for vibrations of the vibration tube 2, the rigidity to be provided to the subframe 108 can be ensured by the outer and inner walls 108b, 108d.

What is claimed is:

1. A Coriolis mass flow meter, comprising:
a main frame, which supports pair of curved tube type vibration tubes with inlets and outlets thereof;
a subframe, which extends in a space between the pair of vibration tubes and the end of which is coupled to the main frame;
a vibration exciter, which is arranged on the subframe, and excites each of the vibration tubes;
first and second detectors, which are arranged on the subframe and are located upstream and a downstream of each of the vibration tubes with the vibration exciter interposed therebetween; and
a circuit board, which is supported by the main frame, wherein
the subframe is formed with a notch that is provided on an inner peripheral side of the curved tube type vibration tube and is open toward the main frame,
the subframe is also formed with an outer peripheral wall extending along an outer peripheral edge of the subframe and an inner peripheral wall extending along the notch, and
the circuit board supported by the main frame is arranged in the portion of the notch.

2. The Coriolis mass flow meter according to claim 1, wherein the circuit board is formed with an exciting circuit associated with the vibration exciter, and a circuit for at least either the first detector or the second detector.

3. The Coriolis mass flow meter according to claim 1, wherein the vibration exciter and the first and second detectors are individually connected to the circuit board through wires.

4. The Coriolis mass flow meter according to claim 3, wherein
the main frame has an opening, and further has a board case that is engaged into the opening to be located therethrough; and
the circuit board is housed into the board case, the circuit board extending through the main frame.

5. The Coriolis mass flow meter according to claim 4, wherein a monitor driving circuit is provided in a portion of the circuit board which is located in a supply/discharge portion of the vibration tube on the opposite side to a measurement portion thereof in which the vibration exciter and the first and second detectors are arranged, with the main frame interposed therebetween, the monitor driving circuit is connected with a display, and the display is mounted on the circuit board.

6. The Coriolis mass flow meter according to claim 1, wherein
the vibration tube has a U-shape in a planar view, and
the subframe and the notch have similar outlines to the U-shape of the vibration tube.

7. The Coriolis mass flow meter according to claim 6, wherein the extremities of the pair of vibration tubes are coupled with each other through insulating plates.

* * * * *